UNITED STATES PATENT OFFICE.

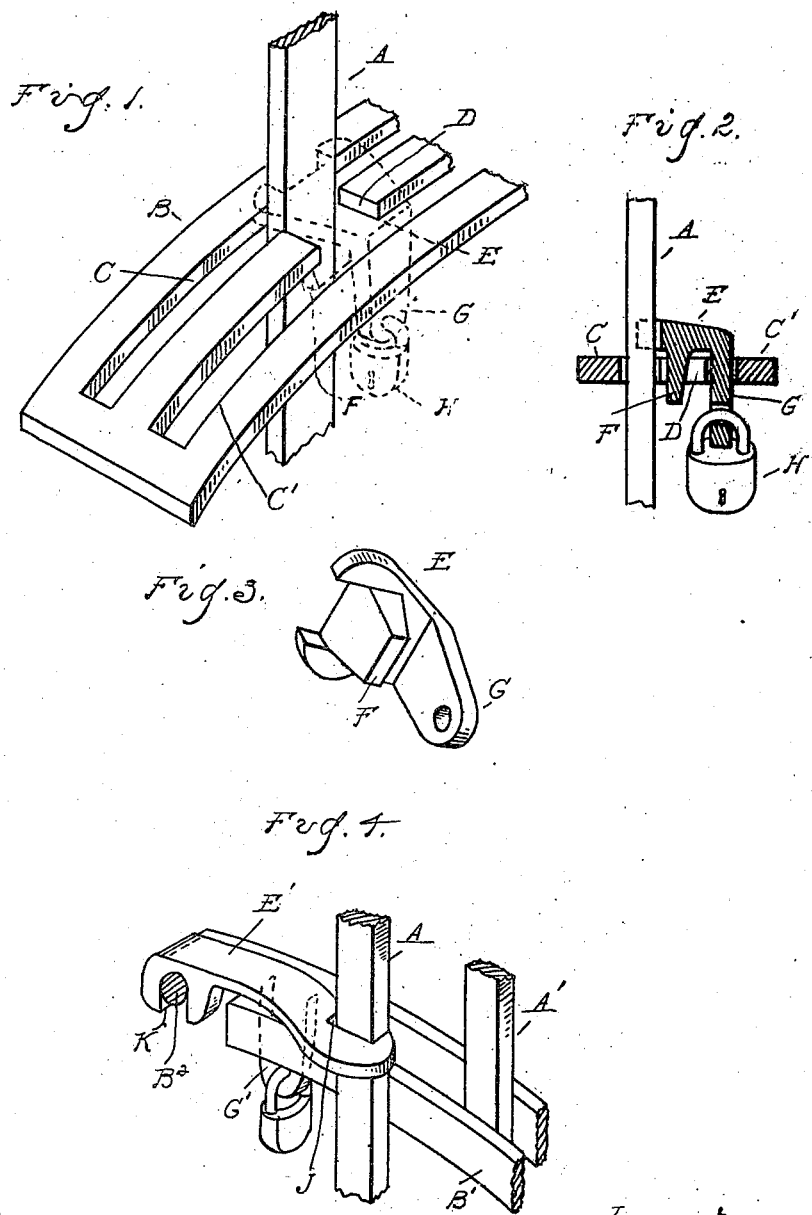

EDWIN PERCY ASHTON, OF DETROIT, MICHIGAN.

LOCKING DEVICE FOR MOTOR-VEHICLE-CONTROL LEVERS.

986,537.  Specification of Letters Patent.  Patented Mar. 14, 1911.

Application filed August 19, 1909. Serial No. 513,643.

*To all whom it may concern:*

Be it known that I, EDWIN PERCY ASHTON, a citizen of the United States of America, residing at Detroit, in the county of Wayne and State of Michigan, have invented certain new and useful Improvements in Locking Devices for Motor-Vehicle-Control Levers, of which the following is a specification, reference being had therein to the accompanying drawings.

It is the object of the invention to provide a simple device applicable to the control lever of an automobile, and by which said lever may be locked in its neutral position so as to prevent the starting of the machine.

To this end, the invention consists in the peculiar construction of a locking dog engageable with the lever and its guide segment, as hereinafter set forth.

In the drawings—Figure 1 is a perspective view of an automobile control lever and its guide segment indicating in dotted lines a locking dog applied thereto. Fig. 2 is a cross section with the locking dog in position; Fig. 3 is a perspective view of the dog; Fig. 4 is a perspective view, illustrating a modified construction.

One form of control for automobiles which has been extensively used is that which is provided with what is commonly known as the "H-shaped slotted guide for the lever". This construction, as illustrated in Fig. 1, consists of a lever A and guide B, the latter being provided with two parallel segmental slots C and C' centrally connected by the cross slot D. The lever, when engaged with either of these slots, is capable of being rocked in opposite directions to the ends of the guide and in its neutral position may be transferred from one slot to the other through the cross slot D. My improvement, when constructed to be applicable to this type of control, consists in a dog E, which is bifurcated to embrace the lever, and is further provided with a portion F for engaging the slot D and a lug G extending through the slot C' and bearing against the guide at one edge thereof. The downwardly-projecting portion of the lug G is apertured to receive a keeper, preferably an ordinary padlock H. Thus the lever A may be locked in its central or neutral position by this dog and disengagement is prevented by the padlock H.

In Fig. 4 a modified construction of control is illustrated, in which two levers A and A' are employed and are arranged to operate from the opposite sides of a guide segment B'. The lever A controls the main clutch of the gearing and is therefore the only one that it is necessary to lock, but as there is no transverse slot D through the guide the dog E is not applicable to this construction. I have therefore provided a modified construction of dog, E', which is bifurcated at J to embrace the lever, and has a portion extending to one end of the guide. The end of this portion is bifurcated at K to engage with the cross bar $B^2$ of the guide, while a lug G' is arranged to extend through the slot in which the lever A' is adjusted. This lug G' is similar in construction to the lug G and is apertured for engagement with the padlock H.

With both constructions, the lever is held from movement by engagement with the dog, and the latter is secured, first, by a shoulder engagement with the guide, and, second, by the lug passing through the guide to which the padlock is secured. Thus the lever cannot be moved without disengagement of the dog from the guide, and such disengagement is not permitted when the padlock is attached to the lug G. On the other hand, the dog may be quickly removed by unlocking and removing the padlock and then lifting the dog from the slot.

What I claim as my invention is:

1. The combination with a control lever, of a guide having a slot at one side of said lever, a dog bifurcated to embrace said lever and having a portion extending through said slot and abutting against the side thereof, and a lock engaging the portion beneath the guide to prevent removal of the dog.

2. The combination with a control lever and an H-shaped slotted guide with which said lever is engaged, of a dog embracing said lever and having a portion engaging the cross slot of the guide.

3. The combination with a control lever and an H-shaped slotted guide with which said lever is engaged, of a dog bifurcated to embrace said lever and having a lug engaging the cross slot of the guide, and a lug extending through a segmental slot of the guide and apertured to receive a lock.

In testimony whereof I affix my signature in presence of two witnesses.

EDWIN PERCY ASHTON.

Witnesses:
 NELLIE KINSELLA,
 HARRY W. GRAHAM.